United States Patent [19]
Hall

[11] Patent Number: 5,860,839
[45] Date of Patent: Jan. 19, 1999

[54] PEDESTAL SEAT BASE ACCESSORY BOARD

[76] Inventor: Sherwood C. Hall, 14088 Matis Peak Rd. P.O. Box 1262, Truckee, Calif. 96160

[21] Appl. No.: 921,446

[22] Filed: Aug. 29, 1997

[51] Int. Cl.[6] .................................................. B60L 15/20
[52] U.S. Cl. ............................................... 440/7; 114/364
[58] Field of Search .................................... 114/153, 343, 114/363, 364; 440/7

[56] References Cited

U.S. PATENT DOCUMENTS

| | | | |
|---|---|---|---|
| 2,968,273 | 1/1961 | Corbett et al. | 114/153 |
| 4,702,713 | 10/1987 | Lee | 114/363 |
| 5,346,415 | 9/1994 | Waymon et al. | 114/363 |

*Primary Examiner*—Ed Swinehart

[57] ABSTRACT

A fishing boat equipment mounting system is provided including a boat having a horizontal deck included therewith with a plurality of seat post holes formed therein for releasably receiving a plurality of seat posts. Next provided is at least one mounting plate including a top face and a bottom face with a periphery formed therebetween. The periphery is defined by a pair of linear parallel side edges and semi-circular end edges. Each mounting plate further has a gripping layer situated along the entire bottom face. A seat post bore and a plurality of mounting apertures are formed between the top and bottom face. By this structure, fishing equipment may be mounted on the top face of the mounting plates and the seat post bore of one of the mounting plates may be aligned with one of the seat post holes of the deck of the boat. Thereafter, one of the seat posts may be situated through the seat post hole and bore, thereby maintaining the mounting plate and fishing equipment in a constant orientation.

3 Claims, 2 Drawing Sheets

PEDESTAL SEAT BASE ACCESSORY BOARD

BACKGROUND OF THE INVENTION

1. Field of the Invention

The present invention relates to fishing equipment mounting assemblies and more particularly pertains to a new PEDESTAL SEAT BASE ACCESSORY BOARD for avoiding drilling a deck of a boat when mounting various fishing equipment in a fixed position on the deck.

2. Description of the Prior Art

The use of fishing equipment mounting assemblies is known in the prior art. More specifically, fishing equipment mounting assemblies heretofore devised and utilized are known to consist basically of familiar, expected and obvious structural configurations, notwithstanding the myriad of designs encompassed by the crowded prior art which have been developed for the fulfillment of countless objectives and requirements.

Known prior art fishing equipment mounting assemblies include U.S. Pat. No. 4,597,356; U.S. Pat. No. 4,008,500; U.S. Pat. No. 5,346,415; U.S. Pat. No. 4,587,921; U.S. Pat. No. 5,197,406; and U.S. Pat. No. 4,722,706.

In these respects, the PEDESTAL SEAT BASE ACCESSORY BOARD according to the present invention substantially departs from the conventional concepts and designs of the prior art, and in so doing provides an apparatus primarily developed for the purpose of avoiding drilling a deck of a boat when mounting various fishing equipment in a fixed position on the deck.

SUMMARY OF THE INVENTION

In view of the foregoing disadvantages inherent in the known types of fishing equipment mounting assemblies now present in the prior art, the present invention provides a new PEDESTAL SEAT BASE ACCESSORY BOARD construction wherein the same can be utilized for avoiding drilling a deck of a boat when mounting various fishing equipment in a fixed position on the deck.

The general purpose of the present invention, which will be described subsequently in greater detail, is to provide a new PEDESTAL SEAT BASE ACCESSORY BOARD apparatus and method which has many of the advantages of the fishing equipment mounting assemblies mentioned heretofore and many novel features that result in a new PEDESTAL SEAT BASE ACCESSORY BOARD which is not anticipated, rendered obvious, suggested, or even implied by any of the prior art fishing equipment mounting assemblies, either alone or in any combination thereof.

To attain this, the present invention generally comprises boat with a horizontal deck. The deck has a plurality of seat post holes formed therein for releasably receiving a plurality of seat posts. A plurality of mounting plates are provided each including a top face and a bottom face with a periphery formed therebetween. The periphery of each mounting plates is defined by a pair of linear parallel side edges and semi-circular end edges. Each mounting plate further has a gripping layer situated along the entire bottom face. A seat post bore is formed between the top and bottom face. For mounting purposes, a plurality of apertures of a first diameter are formed between the top and bottom face. Associated therewith is a plurality of counter bores each of a second diameter greater than the first diameter. Each of the counter bores is formed in the bottom face of the associated mounting plate in concentric relationship with a corresponding one of the apertures. By this structure, fishing equipment may be mounted on the top face of the mounting plates via a plurality of rivets. Further, the seat post bore of one of the mounting plates may be aligned with one of the seat post holes of the deck of the boat and one of the seat posts may be situated through both the hole and bore. As such, the post works in conjunction with the gripping layer to maintain the mounting plate and fishing equipment in a constant orientation. To this end, no drilling is required to maintain various fishing equipment is a fixed position on the deck of the boat.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature an essence of the technical disclosure of the application. The abstract is neither intended to define the invention of the application, which is measured by the claims, nor is it intended to be limiting as to the scope of the invention in any way.

It is therefore an object of the present invention to provide a new PEDESTAL SEAT BASE ACCESSORY BOARD apparatus and method which has many of the advantages of the fishing equipment mounting assemblies mentioned heretofore and many novel features that result in a new PEDESTAL SEAT BASE ACCESSORY BOARD which is not anticipated, rendered obvious, suggested, or even implied by any of the prior art fishing equipment mounting assemblies, either alone or in any combination thereof.

It is another object of the present invention to provide a new PEDESTAL SEAT BASE ACCESSORY BOARD which may be easily and efficiently manufactured and marketed.

It is a further object of the present invention to provide a new PEDESTAL SEAT BASE ACCESSORY BOARD which is of a durable and reliable construction.

An even further object of the present invention is to provide a new PEDESTAL SEAT BASE ACCESSORY BOARD which is susceptible of a low cost of manufacture with regard to both materials and labor, and which accordingly is then susceptible of low prices of sale to the consuming public, thereby making such PEDESTAL SEAT BASE ACCESSORY BOARD economically available to the buying public.

Still yet another object of the present invention is to provide a new PEDESTAL SEAT BASE ACCESSORY BOARD which provides in the apparatuses and methods of the prior art some of the advantages thereof, while simultaneously overcoming some of the disadvantages normally associated therewith.

Still another object of the present invention is to provide a new PEDESTAL SEAT BASE ACCESSORY BOARD for avoiding drilling a deck of a boat when mounting various fishing equipment in a fixed position on the deck.

Even still another object of the present invention is to provide a new PEDESTAL SEAT BASE ACCESSORY BOARD that includes a boat having a horizontal deck included therewith with a plurality of seat post holes formed therein for releasably receiving a plurality of seat posts. Next provided is at least one mounting plate including a top face and a bottom face with a periphery formed therebetween. The periphery is defined by a pair of linear parallel side edges and semi-circular end edges. Each mounting plate further has a gripping layer situated along the entire bottom face. A seat post bore and a plurality of mounting apertures are formed between the top and bottom face. By this structure, fishing equipment may be mounted on the top face of the mounting plates and the seat post bore of one of the mounting plates may be aligned with one of the seat post holes of the deck of the boat. Thereafter, one of the seat posts may be situated through the seat post hole and bore, thereby maintaining the mounting plate and fishing equipment in a constant orientation.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
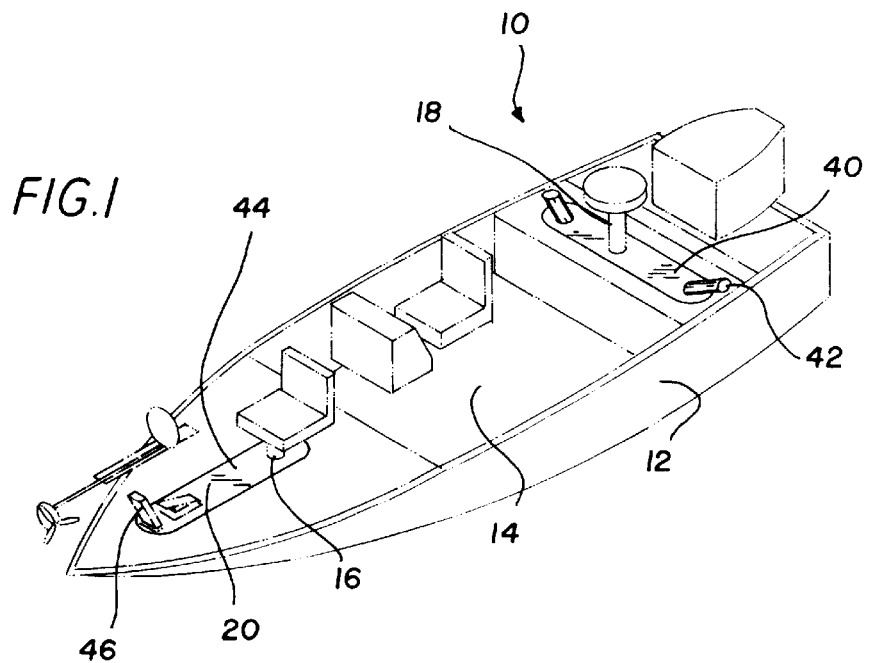
FIG. 1 is a perspective view of a new PEDESTAL SEAT BASE ACCESSORY BOARD according to the present invention.
Figure 2:
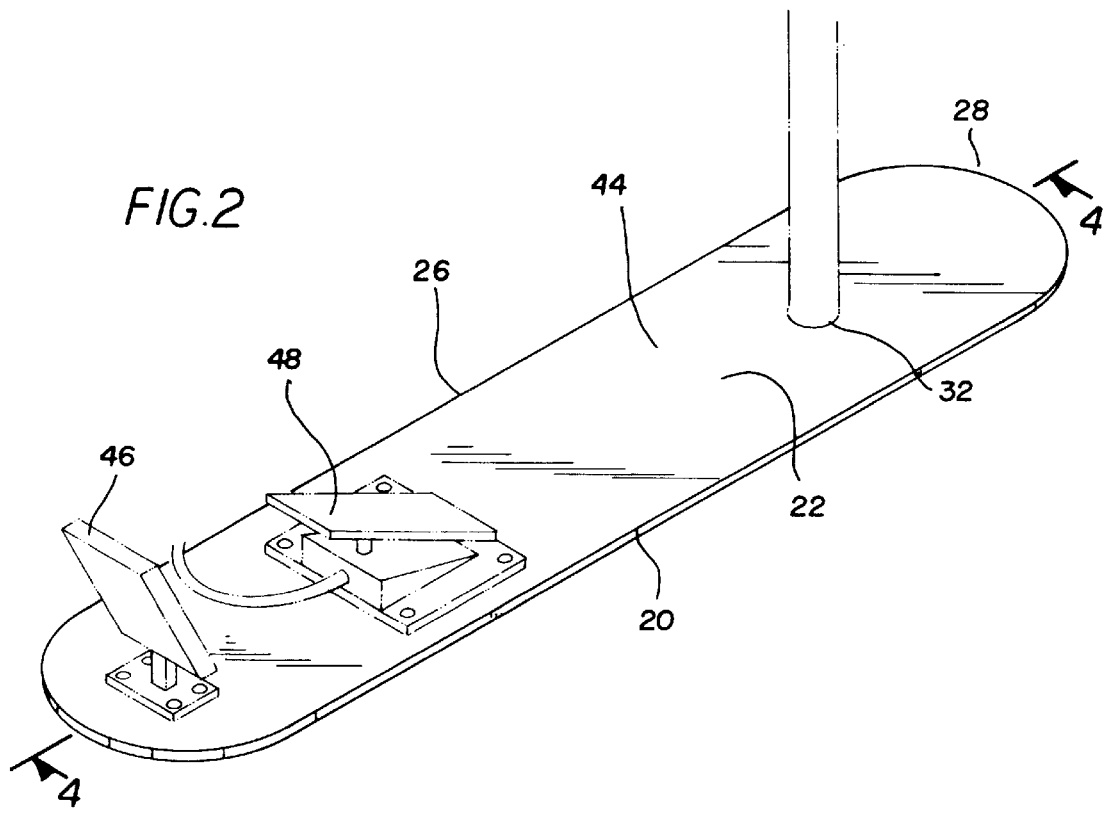
FIG. 2 is a close-up perspective view of one of the mounting plates of the present invention.
Figure 3:
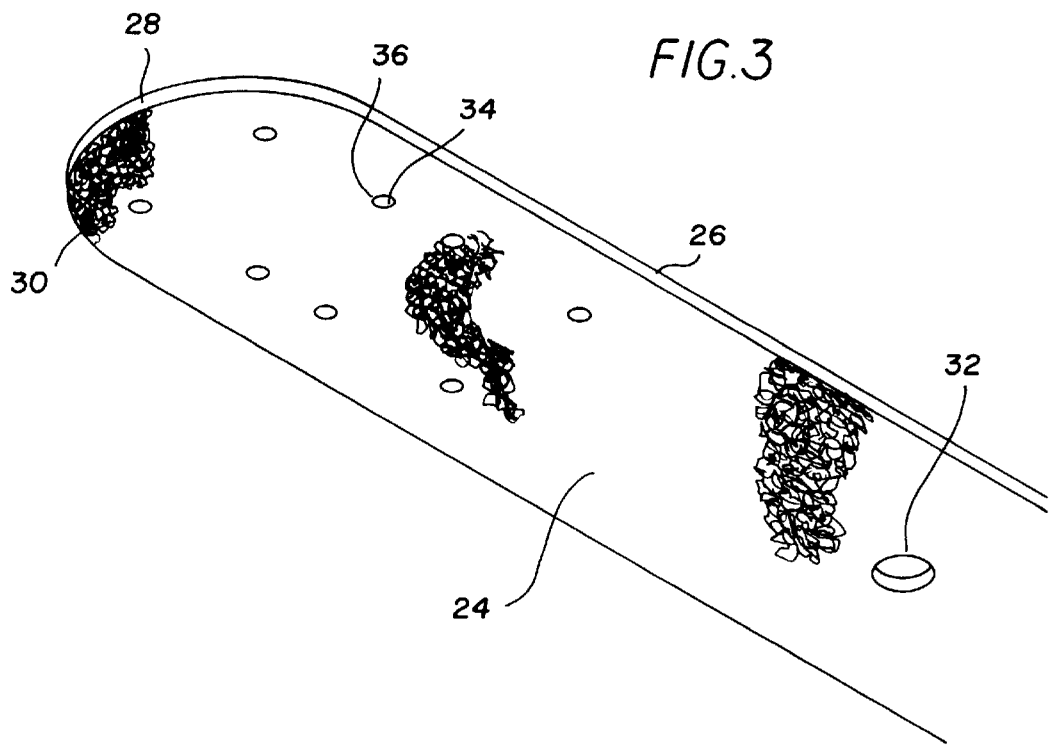
FIG. 3 is a bottom perspective view of the present invention.
Figure 4:
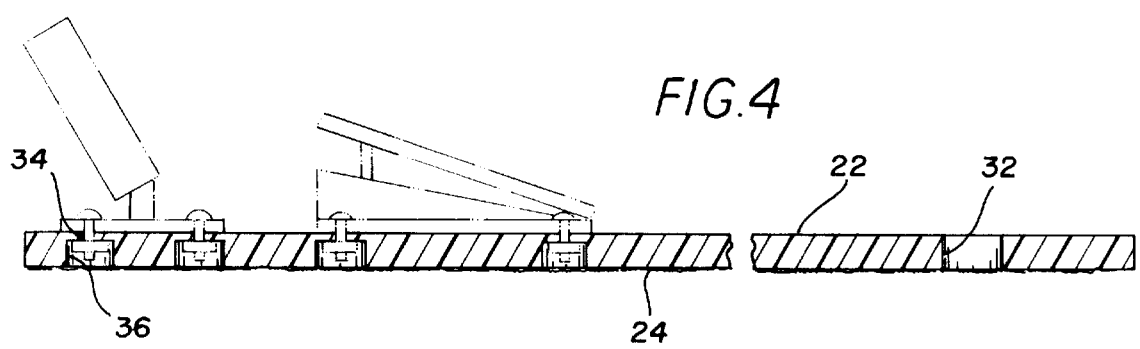
FIG. 4 is a side cross-sectional view of the present invention taken along line 4—4 shown in FIG. 2.

With reference now to the drawings, and in particular to FIGS. 1 through 4 thereof, a new PEDESTAL SEAT BASE ACCESSORY BOARD embodying the principles and concepts of the present invention and generally designated by the reference numeral 10 will be described.

The system 10 of the present invention includes a boat 12 with a horizontal deck 14. The deck has a plurality of seat post holes 16 formed therein for releasably receiving a plurality of seat posts 18.

A plurality of mounting plates 20 are provided each including a top face 22 and a bottom face 24 with a periphery formed therebetween. Each mounting plate ideally has a length of about 30 inches, a width of about 8 inches, and a thickness of ⅜ of an inch and is constructed from plastic. The periphery of each mounting plates is defined by a pair of linear parallel side edges 26 and semi-circular end edges 28. Each mounting plate further has a gripping layer 30 situated along the entire bottom face. Such gripping layer may be constructed from various types of rubber or cloth. A seat post bore 32 is formed between the top and bottom face. For mounting purposes, a plurality of apertures 34 of a first diameter are formed between the top and bottom face. Associated therewith is a plurality of counter bores 36 each of a second diameter greater than the first diameter. Each of the counter bores is formed in the bottom face of the associated mounting plate in concentric relationship with a corresponding one of the apertures.

By this structure, fishing equipment may be mounted on the top face of the mounting plates via a plurality of rivets. Further, the seat post bore of one of the mounting plates may be aligned with one of the seat post holes of the deck of the boat. Thereafter, one of the seat posts may be situated through both the hole and bore. As such, the post works in conjunction with the gripping layer to maintain the mounting plate and fishing equipment in a constant orientation. To this end, no drilling is required to maintain various fishing equipment in a fixed position on the deck of the boat.

In the preferred embodiment, the mounting plates including a first mounting plate 40 with the seat post bore centrally formed therein. The plurality of apertures of the first mounting plate is formed adjacent each of the end edges thereof. As such, the apertures are adapted for allowing the mounting of a pair of downriggers 42 thereon. As shown in FIG. 1, the first mounting plate is situated adjacent a rear of the boat. Further included is a second mounting plate 44 with the seat post bore situated adjacent one of the end edges thereof. The plurality of apertures are formed adjacent another one of the end edges for allowing the mounting of a fish finder 46 and trolling motor actuator pedal 48 thereon. With reference again to FIG. 1, the second mounting plate is positioned adjacent a front of the boat.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A fishing boat equipment mounting system comprising, in combination:

a boat having a horizontal deck included therewith having a plurality of seat post holes formed therein for releasably receiving a plurality of seat posts; and a plurality of mounting plates each including a top face and a bottom face with a periphery formed therebetween, the periphery defined by a pair of linear parallel side edges and semi-circular end edges, each mounting plate further having a gripping layer situated along the entire bottom face, a seat post bore formed between the top and bottom face, a plurality of apertures of a first diameter formed between the top and bottom face, and a plurality of counter bores each of a second diameter greater than the first diameter and each formed in the bottom face in concentric relationship with an associated one of the apertures, whereby fishing equipment may be mounted on the top face of the mounting plates via a plurality of rivets and the seat post bore of one of the mounting plates may be aligned with one of the seat post holes of the deck of the boat and one of the seat posts may be situated therethrough thereby maintaining the mounting plate and fishing equipment in a constant orientation;

said mounting plates including a first mounting plate with the seat post bore centrally formed therein and the plurality of apertures formed adjacent each of the end edges thereof for allowing the mounting of a pair of downriggers thereon and a second mounting plate with the seat post bore situated adjacent one of the end edges thereof and the plurality of apertures formed adjacent another one of the end edges for allowing the mounting of a fish finder and trolling motor actuator pedal thereon.

2. A fishing boat equipment mounting system comprising:

a boat having a horizontal deck included therewith having a plurality of seat post holes formed therein for releasably receiving a plurality of seat posts; and at least one mounting plate including a top face and a bottom face with a periphery formed therebetween, each mounting plate further having a gripping layer situated along the bottom face, a seat post bore formed between the top and bottom face and a plurality of mounting apertures formed between the top and bottom face, whereby fishing equipment may be mounted on the top face of the mounting plate and the seat post bore of one of the mounting plates may be aligned with one of the seat post holes of the deck of the boat and one of the seat posts may be situated therethrough thereby maintaining the mounting plate and fishing equipment in a constant orientation;

wherein the mounting plate has the seat post bore thereof centrally formed therein and the plurality of apertures formed adjacent each of the end edges thereof for allowing the mounting of a pair of downriggers thereon.

3. A fishing boat equipment mounting system as set forth in claim 2 wherein the mounting apertures have a first diameter and further included is a plurality of counter bores each of a second diameter greater than the first diameter and each formed in the bottom face in concentric relationship with an associated one of the apertures.

\* \* \* \* \*